US005424766A

United States Patent [19]

Anderson

[11] Patent Number: 5,424,766

[45] Date of Patent: Jun. 13, 1995

[54] INK JET PRINTER CONTROL SYSTEM RESPONSIVE TO ACOUSTICAL PROPERTIES OF INK

[75] Inventor: Philip D. Anderson, Elk Grove Vlg., Ill.

[73] Assignee: Videojet Systems International, Inc., Wooddale, Ill.

[21] Appl. No.: 148,392

[22] Filed: Nov. 8, 1993

[51] Int. Cl.[6] .................... G01D 15/18

[52] U.S. Cl. .................... 347/7; 347/89

[58] Field of Search .................... 347/7, 89, 90

[56] References Cited

U.S. PATENT DOCUMENTS

| | | | |
|---|---|---|---|
| 3,771,456 | 11/1973 | Bischoff et al. | 347/89 |
| 3,930,258 | 12/1975 | Dick et al. | 347/89 |
| 4,121,222 | 10/1978 | Diebold et al. | 347/89 |
| 4,317,124 | 2/1982 | Shirato et al. | 347/89 |
| 4,555,712 | 11/1985 | Arway et al. | 347/89 |
| 4,827,280 | 5/1989 | Stamer et al. | 347/89 |

OTHER PUBLICATIONS

Instruction manual for "Sonic Solution Monitor" by Nusonics, Inc. dated Jan. 3, 1974, pp. 6–10.

"A Versatile Laboratory Tool: Model 6080 Nusonics Concentration Analyzer" by MAPCO, Inc., dated Jul. 15, 1980, pp. 2-1 to 2-6.

"Controlling Print Height in an Ink Jet Printer" by J. M. Carmichael, IBM Journal of Research and Development, vol. 21, No. 1, Jan. of 1977, pp. 52–55.

*Primary Examiner*—Benjamin R. Fuller

*Assistant Examiner*—Valerie Ann Lund

*Attorney, Agent, or Firm*—Rockey, Rifkin and Ryther

[57] ABSTRACT

A control system is disclosed for an ink jet printer. The control system employs acoustic transducers to determine the velocity of sound in the ink and in a reference chamber containing only fresh ink. By comparing the two measurements it can be determined when to add additional solvent to the system to maintain solids concentration substantially constant.

16 Claims, 2 Drawing Sheets

INK JET PRINTER CONTROL SYSTEM RESPONSIVE TO ACOUSTICAL PROPERTIES OF INK

BACKGROUND OF THE INVENTION

This invention relates to the field of drop marking systems of the type in which a liquid ink is forced under pressure through a nozzle which converts the liquid into droplets which can then be controlled by various means while projected toward a substrate for marking purposes. Examples of such systems include the familiar ink jet marking systems used for high speed label printing, product identification and the like, although there are other drop marking systems known in the art. One particular type of system which advantageously employs the present invention is the continuous stream, ink jet printer. Such a system typically includes an ink reservoir and a remotely located nozzle connected to the reservoir by a conduit. Ink is forced under pressure from the reservoir to the nozzle which emits a continuous stream of ink drops. The ink, which is electrically conductive, is provided with a charge as the drops leave the nozzle. The drops then pass through a deflection field which causes selected drops to be deflected so that some of the drops are deposited onto a substrate while the remaining drops are returned to the reservoir by a suitable ink return means.

In order to produce high quality marking, it is important that the ink is maintained at its formulated concentration of nonevaporative solids. Ink drop formation, drop electrical charge, drop velocity, spot placement accuracy, spot placement precision, spot adhesion, spot drying time, and spot optical properties are printing parameters that have some dependence on ink properties. These ink properties include composition, electrical conductivity, density, acoustic velocity, surface tension, and viscosity. These ink properties have a dependence on solids concentration. So, if ink solids concentration deviates from specifications, the print quality may also deviate from acceptable standards.

Print quality is highly dependent on drop velocity. In turn, drop velocity is dependent on ink viscosity. Ink viscosity is highly dependent on ink solids concentration. Thus, drop velocity and print quality are strongly dependent on ink solids concentration.

The condition of constant ink drop velocity through the deflection field requires that the flow rate of liquid through the nozzle be substantially constant. Prior ink marking systems have attempted to accommodate this requirement by various means.

One such system employs a specific gravity detector which signals when it is necessary to add solvent to the ink supply. This system is unsuitable for use in systems where the printer must accommodate many different types of inks, each with its own specific gravity parameters.

Another commercial system which tries to deal with the problem of changing drop velocity was manufactured by the IBM Corporation. In this device the ink pressure is responsive to signals from a deflection detector. The deflection detector is located in the electric field through which the drops pass. The detector signals the pump to increase or decrease pressure, as necessary, to maintain drop velocity at an appropriate value. The system provides feedback control of drop velocity. The technique, however, is not entirely satisfactory because of the complexity and cost of the components and the need for a fragile deflection detector at the remote print head location.

Another invention, disclosed in U.S. Pat. No. 4,555,712, monitors the ink flow rate, monitors the velocity of the drops of ink in the charge field and, by use of an electronic controller, adjusts the ink parameters to maintain a desired flow rate which insures a substantially constant drop velocity.

It is an object of the present invention to incorporate direct feedback control into an ink solids concentration control system which is simpler, reliable and low in cost.

Another object of the invention is to provide a velocity control system for an ink jet printer which maintains substantially constant velocity of ink entering a deflection field thereby insuring accurate location of spots on the substrate to be marked.

A further object of the invention is to provide an electronic control system employing acoustic transducers to measure the velocity of sound in ink to permit accurate control of the addition of solvent to the ink.

Another object of the invention is to provide a flow control means for an ink system which is located entirely separate from the print head nozzle and yet maintains a substantially constant flow rate through the nozzle.

Other objects and advantages of the invention will be apparent from the remaining portion of the description.

SUMMARY OF THE INVENTION

The present invention employs sound velocity measurement to determine ink concentration. A transducer is used to emit an acoustic pulse in a reference chamber fed directly by a fresh ink supply. This reference measurement is used as the control input to a feedback control system. A similar acoustical measurement is taken in either the return reservoir or the high pressure supply reservoir, or both, by additional transducers. These measurements are also fed to the control system, for example, a microprocessor, which determines the difference and directs appropriate adjustments in ink concentration by adding solvent or if fluid level is low, adds fresh ink.

In addition to the previously mentioned advantages, this system eliminates the need for float based level sensors and evaporated loss measurements as are frequently used in the prior art to maintain fluid levels and viscosity. In the supply and return reservoirs the acoustic transducer will receive a second acoustic pulse reflected from the liquid surface indicative of fluid level and flow rate. While the resulting fluid level data is not required for concentration control, this data can be used to maintain optimal fluid levels and to provide flow rate measurements in the system.

In a typical application, the ink flow rate and drop velocity are initially set using fresh ink by adjustment of the pressure in the ink flow line, to a condition which yields proper drop spacing. Thereafter the acoustic measurements from either the supply or return reservoirs coupled with signals from the reference chamber permit precise ink concentration control.

DETAILED DESCRIPTION OF THE INVENTION

Figure 1:
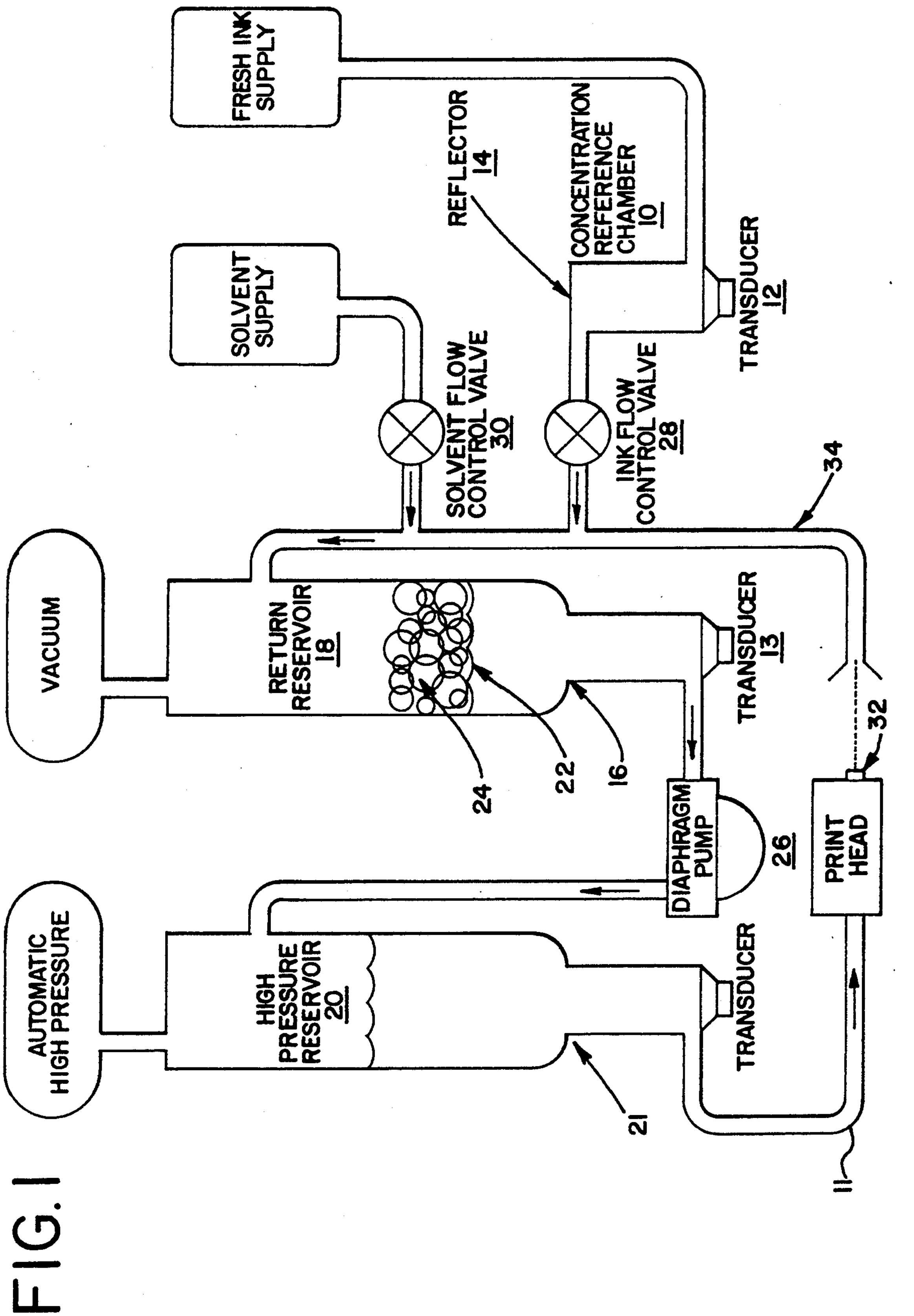
FIG. 1 is a schematic drawing of an ink jet printing system incorporating the elements of the present invention.

Referring to FIG. 1, a generalized schematic of the invention, applied to a typical ink drop marking system, is shown. In a typical ink drop marking system a plurality of ink drops separated by a pre-determined spacing emanate from an ink jet nozzle 32. The nozzle 32 is acted upon by a piezo electric device in a manner well known in the art (see, for example, U.S. Pat. No. 3,512,172). The drops pass adjacent a charging electrode and then through an electrical deflection field (not shown). Ink flows to the nozzle 32 by way of a flexible conduit 11 from a pressurized reservoir 20 which is usually located remotely of the print head 26. If desired, the reservoir may supply ink to several such print heads.

The high pressure reservoir 20 is supplied with ink by various suitable means, many forms of which are known in the art. Typically, a recirculation system will include an ink drop return conduit 34 to return unused ink drops to a return ink reservoir 18 using vacuum pressure. Typical ink recirculation systems also include means for replenishing ink and solvent in order to make up for depletion during operation.

According to the present invention, an ink concentration reference chamber 10 is positioned between the fresh ink supply and an ink flow control value 28. Mounted on the bottom exterior of the base of the reference chamber 10 is an acoustic transducer 12, which emits an acoustic pulse through the fresh ink to a reflector 14, which in this case may be the top of the chamber. A reflection occurs and is detected by the transducer. The time delay required for the reflection is a function of velocity of sound through the fresh ink. It is also within the teachings of the present invention to measure other acoustic properties of ink utilizing acoustic sensors that relate ink solids concentration to ink density and ink viscosity. The resultant information is used as one input to the control system in FIG. 2.

A transducer 12 is also mounted on the bottom of the high pressure ink reservoir 20 or the return ink reservoir 18 (or both). For these reservoirs acoustic reflection to generate a return signal can be provided by a solid surface or a change in the acoustical impedance of the fluid column produced, for example, by a change in diameter 16 shown of the reservoir 18 and at 21 in reservoir 20. Preferably, the ink concentration reference chamber 10 and the reservoirs 18 and 20 are constructed so that the acoustical paths through the ink are identical in length, thereby obviating the need to compensate for chamber geometry, etc.

Figure 2:
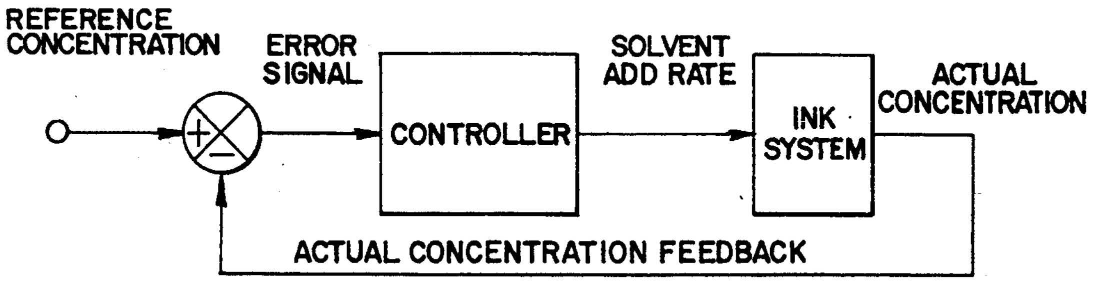
FIG. 2 is a block diagram of a closed-loop electronic control system suitable for practicing the invention.

The concentration reference signal from transducer 12 and the return reservoir concentration signal (reflected from the constriction point 16), from the return reservoir transducer 13, for example, are fed to the closed loop control system depicted in FIG. 2. Any difference in the two signals generates an error signal for the controller, which in turn generates a solvent-add signal for operating the solvent flow control valve 30. Solvent is thereby added as needed, to the ink return system to maintain the reservoir 20 ink supply substantially identical in concentration to that present in reference chamber 10. The controller (FIG. 2) may be a solid state logic system or a programmed computer as, for example, a microprocessor computer system of the typed typically used for process control. As the ink in the return reservoir is diluted with solvent, its sound velocity begins to match the sound velocity in the control chamber. This reduces the magnitude of the error signal. In turn, this reduces the rate of addition or terminates the flow of solvent.

There is an additional benefit from using the sound transducers according to the invention. Float-based sensors such as used in the prior art are vulnerable to errors caused by mechanical binding, triggering errors, hysteresis and ink foam (as shown at 24). Solid state measurement of fluid level external of the reservoir avoids these errors. Without any additional hardware, fluid levels can be measured and regulated. In either reservoir 18 or 20 the transducer will receive a second pulse reflected from the liquid surface (for example 22 in the return reservoir).

Figure 3:
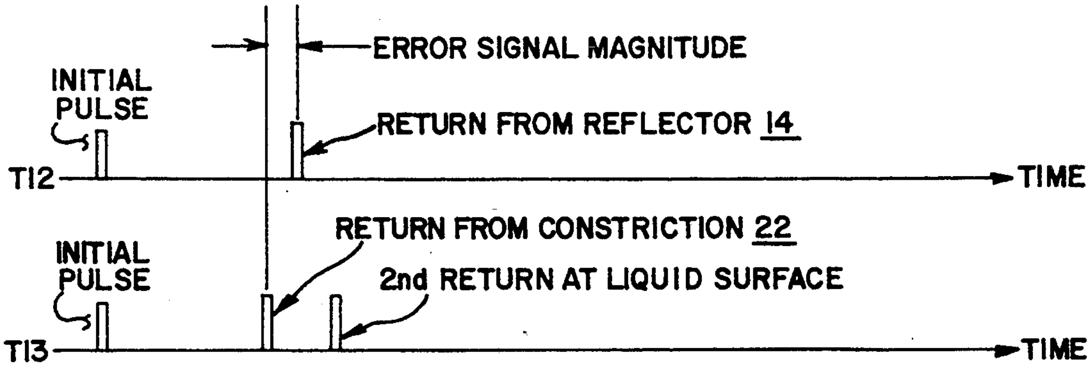
FIG. 3 is a waveform diagram showing the acoustic pulses and the relationship of the return pulses used to generate error signals.

A fluid level controller using these data from the transducer 13 can maintain optimum levels in the reservoirs by operating a pump to provide fresh ink through flow control value 28. FIG. 3 shows the transmitted and received pulses as described herein. It will be apparent to those skilled in the art that one controller can perform both functions, that is, regulate the addition of solvent and fresh ink to the system. The second return pulse defines a time interval which correlates with the ink level in the return (or the high pressure) reservoir. The time interval may be compared with a reference value stored in the controller memory and the result of that comparison used to control operation of the fresh ink valve in the same manner as the solvent valve is operated.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed:

1. An ink control apparatus for a drop marking system which includes a pressure reservoir and a return reservoir, a printhead receiving ink from the pressure reservoir, means for returning unused ink to the return reservoir and means for communicating ink from the return reservoir to the pressure reservoir, the apparatus comprising:
   a) a solvent supply including a valve for controlling the addition of solvent to the ink received in the return reservoir;
   b) a reference chamber containing fresh ink;
   c) a first acoustic transducer associated with said reference chamber oriented to transmit acoustic pulses through the ink and to detect echo returns, a time delay between the transmission and return of a pulse being a function of the concentration of the ink in the reference chamber;
   d) a second acoustic transducer associated with said return reservoir oriented to transmit acoustic pulses through the ink and to detect echo returns, the time delay between the transmission and return of a pulse being a function of the concentration of the ink in the return reservoir;
   e) means for comparing the time delays of the echo returns from the reference chamber with the time delays of the echo returns from the return reservoir and for controlling operation of the solvent supply valve as a function of the difference therebetween;

whereby solvent is added to the ink received in the return reservoir to keep the concentration therein substantially the same as the ink in the reference chamber.

2. The apparatus of claim 1 wherein said reference chamber incorporates a reflector surface positioned opposite the transducer to produce said echo return after the pulse passes through the ink.

3. The apparatus of claim 1 wherein said return reservoir includes a first and a second portion each of dissimilar physical configuration, said echo returns being produced by the change in acoustical impedance at a point of connection between the two portions.

4. The apparatus of claim 3 wherein said first portion is of substantially equal height to said reference chamber, whereby the echo returns from the return reservoir and the echo returns from the reference chamber are directly compared, without need for calibration for any difference in volume or path length through the ink.

5. The apparatus of claim 1 further including means for controlling the addition of fresh ink to the return reservoir, said means comprising:

a) a fresh ink supply and an ink valve associated therewith for communicating ink to the return reservoir; and b) means for comparing the time delay between the transmission and return of an acoustic pulse in the return reservoir which is related to the ink level in said return reservoir with a value representative of a desired ink level, and for operating said ink valve to add fresh ink as a function of the difference therebetween.

6. An ink control apparatus for a drop marking system which includes a pressure reservoir and a return reservoir, a printhead receiving ink from the pressure reservoir, means for returning unused ink to the return reservoir and means for communicating ink from the return reservoir to the pressure reservoir, the apparatus comprising:

a) a solvent supply including a valve for controlling the addition of solvent to the ink received in the return reservoir;

b) a reference chamber containing fresh ink;

c) a first acoustic transducer associated with said reference chamber oriented to transmit acoustic pulses through the ink and to detect echo returns, a time delay between the transmission and return of a pulse being a function of the concentration of the ink in the reference chamber;

d) a second acoustic transducer associated with said pressure reservoir oriented to transmit acoustic pulses through the ink and to detect echo returns, the time delay between the transmission and return of a pulse being a function of the concentration of the ink in the pressure reservoir;

e) means for comparing the time delays of the echo returns from the reference chamber with the time delays of said pressure reservoir and for controlling operation of the solvent supply valve as a function of the difference therebetween;

whereby solvent is added to the ink received in the return reservoir to keep the concentration in the drop marking system substantially the same as the ink in the reference chamber.

7. The apparatus of claim 6 wherein said pressure reservoir includes a first and a second portion each of dissimilar physical configuration, said echo returns being produced by the change in acoustical impedance at a point of connection between the two portions.

8. The apparatus of claim 7 wherein said first portion is of substantially equal height to said reference chamber, whereby the echo returns from the pressure reservoir and the echo returns from the reference chamber are directly compared, without need for calibration for any difference in volume or path length through the ink.

9. The apparatus of claim 6 further including means for adding fresh ink to the return reservoir, said means comprising:

a) a fresh ink supply and an ink valve associated therewith for communicating ink to the return reservoir;

b) means for comparing the time delay between the transmission and return of an acoustic pulse in the supply reservoir which is related to the ink level in said supply reservoir with a value representative of a desired ink level and for operating said ink valve to add fresh ink as a function of the difference therebetween.

10. A method for maintaining print quality utilizing an ink jet printer which has a reservoir to supply ink to a print head that has at least one orifice for projecting a stream of droplets toward a surface to be marked, the stream of droplets being electrically controlled to be directed toward the surface or directed toward a catcher to be captured and then returned to the ink reservoir, said ink jet printer having a source of fresh ink and a source of solvent which are selectively connected to the ink reservoir to add fresh ink and solvent to the return reservoir, the method comprising the steps of:

(a) measuring acoustic properties of the fresh ink in said fresh ink source to obtain a reference signal value related to ink solids concentration, (b) measuring the solids concentration of the captured ink to obtain a signal value representative of the ink solids concentration in the captured ink, (c) comparing said reference signal value and said representative signal value to generate an error signal proportional to the solids concentration variation between the captured ink and the fresh ink, and (d) controlling the addition of solvent as a function of said error signals.

11. An ink control apparatus for a drop marking system which includes at least one reservoir, a printhead receiving ink from the reservoir and means for returning unused ink to the reservoir, the apparatus comprising:

a) a solvent supply including a valve for controlling the addition of solvent to the ink received in the reservoir;

b) a reference chamber containing fresh ink;

c) a first acoustic transmitter associated with said reference chamber oriented to transmit acoustic pulses through the ink and a first acoustic receiver to detect said acoustic pulses after said pulses have travelled through the ink, a time delay between the transmission of a pulse and reception of the pulse being a function of the concentration of the ink in the reference chamber;

d) a second acoustic transmitter associated with said reservoir oriented to transmit acoustic pulses through the ink and a second acoustic receiver to detect said acoustic pulses after said pulses have travelled through the ink, the time delay between the transmission of a pulse and reception of the pulse being a function of the concentration of the ink in said reservoir; and e) means for comparing the time delays of the echo returns from the reference chamber with the time delays of the echo returns from the reservoir and for controlling operation of the solvent supply valve as a function of the difference therebetween;

whereby solvent is added to the ink received in the reservoir to keep the concentration therein substantially the same as the ink in the reference chamber.

12. The apparatus of claim 11 wherein said apparatus includes a pressure reservoir, a return reservoir and means for communicating ink therebetween and wherein the printhead receives ink from the pressure reservoir, the unused ink is returned to the return reservoir and solvent is added to the return reservoir.

13. The apparatus of claim 12 wherein said first acoustic transmitter and said first acoustic receiver are associated with said return reservoir.

14. The apparatus of claim 13 wherein said first acoustic transmitter and said first acoustic receiver are combined in a single first acoustic transducer.

15. The apparatus of claim 12 wherein said second acoustic transmitter and said second acoustic receiver are associated with said pressure reservoir.

16. The apparatus of claim 15 wherein said second acoustic transmitter and said second acoustic receiver are combined in a single first acoustic transducer.

* * * * *